(12) United States Patent
Hicks

(10) Patent No.: US 11,431,156 B2
(45) Date of Patent: Aug. 30, 2022

(54) WIRE MANAGEMENT DEVICE

(71) Applicant: Tadpole Products, LLC, Cincinnati, OH (US)

(72) Inventor: Ronald J. Hicks, West Chester, OH (US)

(73) Assignee: Tadpole Products, LLC, Cincinnati, OH (US)

( * ) Notice: Subject to any disclaimer, the term of this patent is extended or adjusted under 35 U.S.C. 154(b) by 0 days.

(21) Appl. No.: 16/951,608

(22) Filed: Nov. 18, 2020

(65) Prior Publication Data

US 2022/0158426 A1 May 19, 2022

(51) Int. Cl.
*F16L 3/00* (2006.01)
*H02G 3/04* (2006.01)
*F16L 3/13* (2006.01)

(52) U.S. Cl.
CPC .............. *H02G 3/0437* (2013.01); *F16L 3/13* (2013.01)

(58) Field of Classification Search
None
See application file for complete search history.

(56) References Cited

U.S. PATENT DOCUMENTS

| | | | | |
|---|---|---|---|---|
| 3,916,089 A | * | 10/1975 | Sloan | B60M 1/34 174/164 |
| 4,244,544 A | * | 1/1981 | Kornat | F16L 3/13 248/68.1 |
| 7,608,782 B2 | * | 10/2009 | Hill | H01R 4/646 174/84 C |
| 8,091,846 B1 | * | 1/2012 | Britner | B25H 1/00 248/219.3 |
| 8,290,330 B2 | * | 10/2012 | Taylor | H04Q 1/06 385/135 |
| 10,123,449 B1 | * | 11/2018 | Stevens | H05K 7/1491 |
| 10,439,381 B1 | * | 10/2019 | Mohlman | H02G 3/0406 |
| 10,826,247 B1 | * | 11/2020 | Gilbert | H01R 13/6596 |

FOREIGN PATENT DOCUMENTS

EP 1180838 A1 * 2/2002 ............... H02G 3/26

* cited by examiner

*Primary Examiner* — Steven M Marsh
(74) *Attorney, Agent, or Firm* — Wood Herron & Evans LLP

(57) ABSTRACT

A wire management device for mounting to a structure that has a mounting surface with an edge includes a planar portion having opposing side edges, a front face and a rear face that is configured for engaging the mounting surface. A wire management structure is coupled to extend from the front face and is configured for capturing elongated wires to secure a portion of the wires with the wire management device. An alignment structure is positioned proximate at least one side edge of the planar portion. The alignment structure is configured for engaging an edge of the mounting surface to align the side edges of the planar portion with respect to the mounting surface edges for centering the device. Once the wire management device is mounted, the alignment structure is breakable from the planar portion for being separated and discarded. Then a cover is clipped onto the wire management structure.

20 Claims, 16 Drawing Sheets

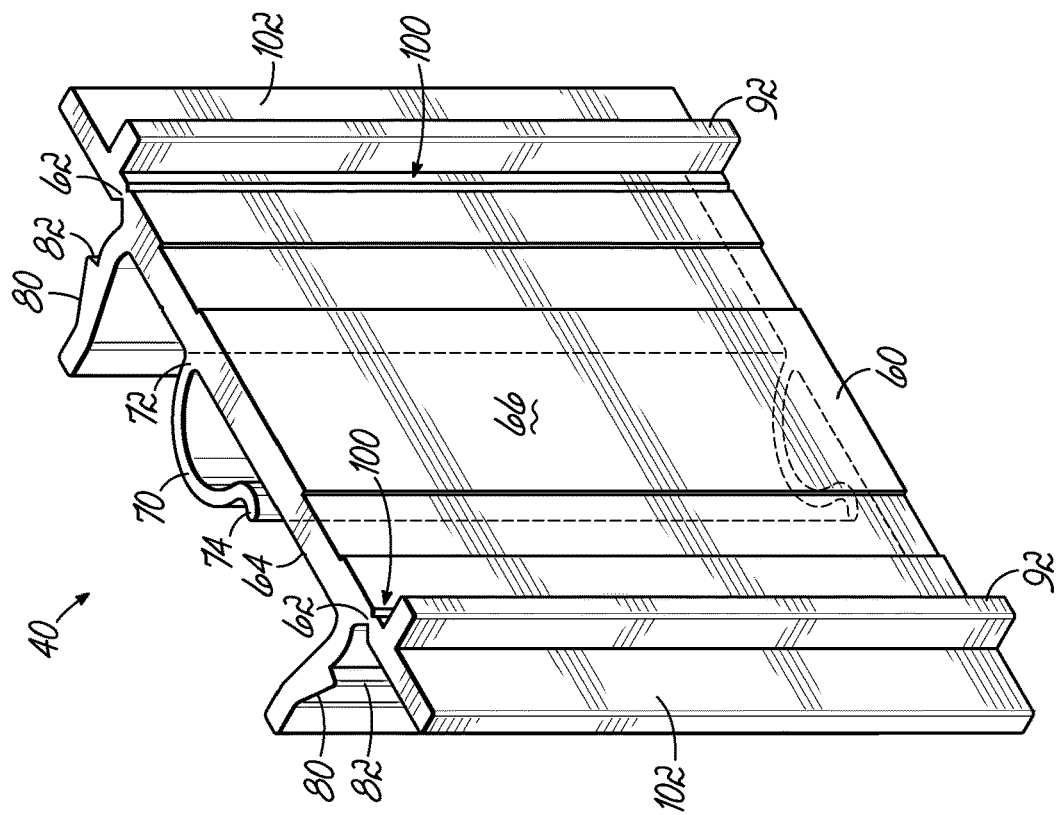
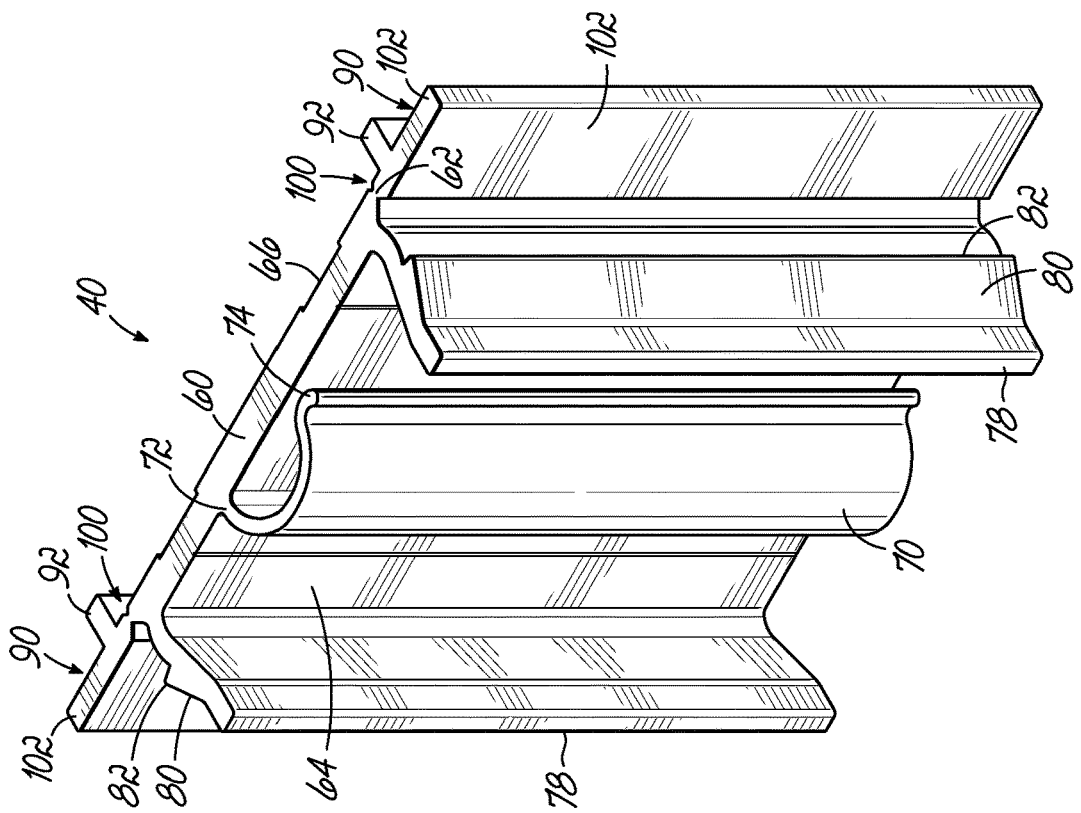
FIG. 3
FIG. 2

WIRE MANAGEMENT DEVICE

TECHNICAL FIELD OF THE INVENTION

The present invention is directed to a wire management device for managing the installation of wires along structures.

BACKGROUND OF THE INVENTION

Generally, wires are used in various locations in a building, such as to power devices, connect devices in a network, or otherwise deliver an electrical signal or power between a plurality of locations. If such wires are part of the new construction of a building, they can often be routed and positioned behind existing wall structures. However, if the wire installation is part of a retrofit after construction is complete, then they will often be exposed or will have to otherwise be managed. Pulling or fishing the wires behind and in a wall or ceiling may not be a practical solution, depending on the structure. If the wires are exposed, such an exposed installation is undesirable in many commercial settings due to the exposed wires detracting from the overall aesthetic appeal of the space.

In building installations involving glass entries, store front or curtainwall framing is typically used to surround the glass doors in a field of glass and framing members. Pathways for the instillation of the wiring to these glass doors can be a significant problem. There are no wall structures through which wires might be fished and hidden. Rather, large glass windowpanes are often the wall structure or door structure. The glass panes of a store front or curtainwall, for example, rest on a base, such as a metal base, and are coupled together vertically by mullion structures that secure the panes along their vertical edges. The mullion structures capture the edges of the glass panes and interface with the base structure to structurally support the panes and form the glass walls and provide an aesthetically desirable installation. With glass doors, frame structures and mullion structures interface to form a door opening in the glass wall. The mullion structures and frame elements that support and secure the glass or a door are usually made with a desirable metal finish to provide a nice design and appearance.

If it becomes necessary to run wires in such an installation, such as to a full glass door that is surrounded by glass and mullion members, the wires obviously cannot span across the glass. Rather, they are currently installed or fished inside the mullion structure to the door frame structures without an securing methods. These mullion and frame structures are not intended to have wires contained inside. Beyond the difficulty of fishing the wires through the various mullion pathways, there are also many sharp edges within the mullions that represent a threat to damage these wires during initial installation or abrade them over time. As may be appreciated, exposed wires along the metal mullion or frame structures present a less than desirable appearance as well. To address such issues, mounting devices having covers could be used. The mounting devices could be mounted on a mullion or frame structure and have clips or other structures that secure the wires in position. Once installed, the cover is placed over the mounting structure and wires to cover or hide the installation.

One significant issue with existing wire mounting structures on mullions is that they all must be exactly and accurately aligned along the length of the mullion or other structure for a pleasing appearance. If the cover is intended to match the mullion structure such that it is visible as a separate cover, the accuracy of installing the structure becomes more critical. Generally, there are multiple structures that are used along the height of the mullion structure and they each have to be aligned exactly to ensure that the cover that is used will align along the mullion structure. To that end, various measurements and markings must be used for mounting each mounting structure to the mullion. Then generally, each mounting structure has to be held very still in position while it is fastened to the mullion structure. For taller mullion structures, such an installation may also require a ladder. It often may have to be a two person installation process to ensure proper alignment. Then, each additional mounting structure along a mullion has to be aligned with the other previously installed mounting structures to ensure that the completed installation will accept the long cover and the cover will be in the proper position on the mullion structure so that it is not skewed to either side. As may be appreciated, such installations may be time consuming and if the structures are not accurately aligned such that the cover does not fit properly, the installation process may have to be repeated until proper installation is achieved.

Accordingly, it is desirable to improve upon wire management systems and particularly to improve upon such wire management systems as used with glass wall and building storefront installations and glass door installations.

SUMMARY OF THE INVENTION

A wire management device for mounting to a structure having a mounting surface with an edge includes a planar portion or base plate having opposing side edges, a front face and a rear face that is configured for engaging the mounting surface. A wire management structure is coupled to extend from the front face and is configured for capturing elongated wires to secure a portion of the wires with the wire management device. An alignment structure is positioned proximate at least one side edge of the planar portion. The alignment structure, which may include an alignment fin, is configured for engaging an edge of the mounting surface to align the side edges of the planar portion with respect to the mounting surface edges for centering the device. The aligned wire management may then be fastened to the structure. Once the wire management device is mounted, the alignment structure is breakable from the planar portion for being separated and discarded. Then a cover may be clipped onto the wire management structure to cover the wires and blend with the structure to which the wires are mounted.

BRIEF DESCRIPTION OF THE DRAWINGS

FIG. 2 is a front perspective view of a wire management device in accordance with an embodiment of the invention as shown in FIG. 1.

FIG. 3 is a rear perspective view of a wire management device in accordance with an embodiment of the invention as shown in FIG. 1.

DETAILED DESCRIPTION OF EMBODIMENTS OF THE INVENTION

Figure 1A:
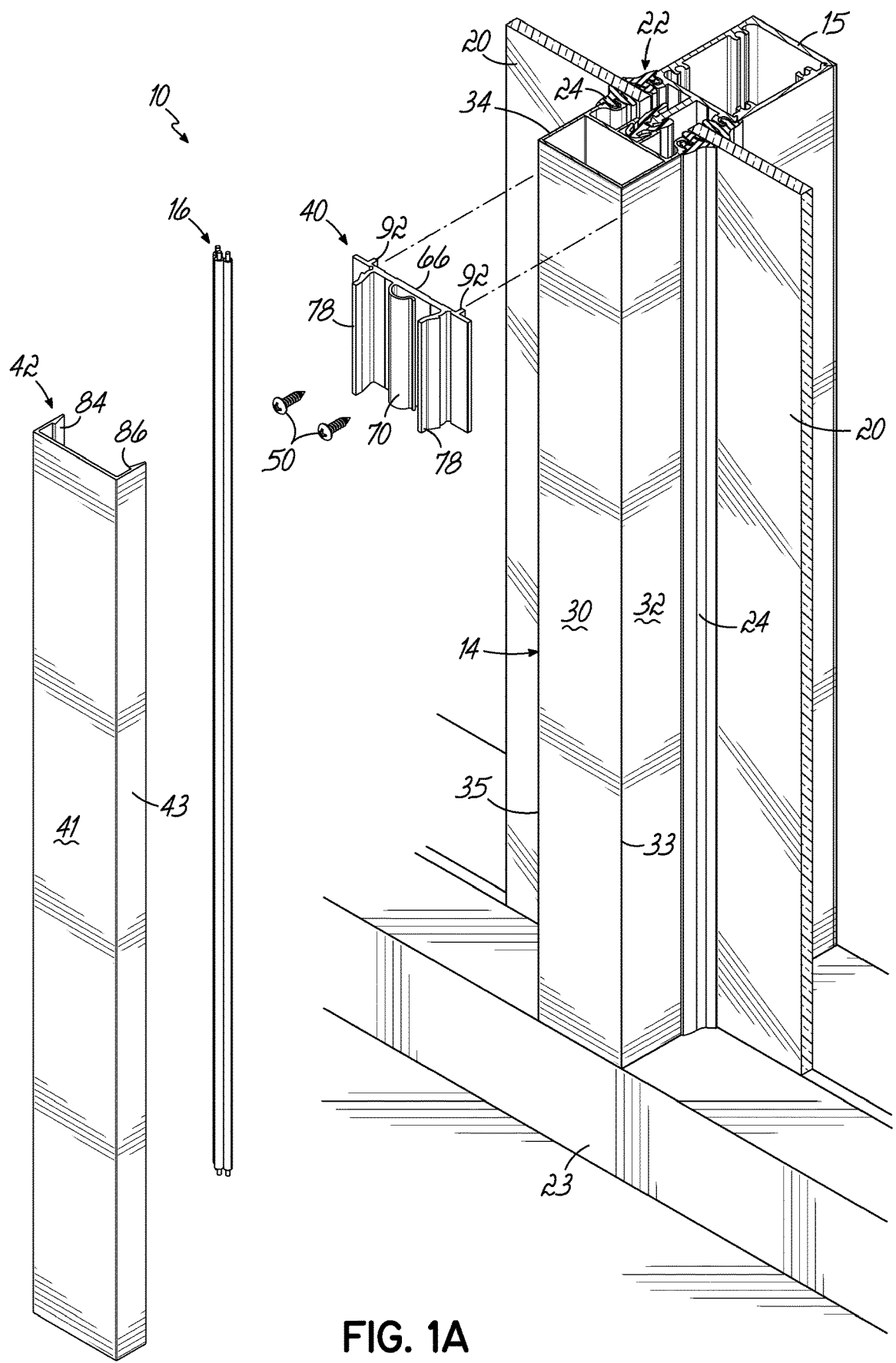
FIGS. 1A-1C are perspective exploded views of an installation of a wire management device in accordance with an embodiment of the invention.

FIG. 1A illustrates a wire management system 10 in accordance with one embodiment of the invention for use with frame structures, such as window mullions. The system 10 includes a wire or cable management device 40 that mounts to a structure 14, such as a mullion structure, for retaining wires and cables 16 along the structure 14 and with the structure are generally hidden from view. In the illustrated embodiment of FIG. 1A, the structure 14 is a window mullion that interfaces with another mullion structure 15 on either side of windowpanes 20. As would be understood by a person of ordinary skill in the art, the mullions 14, 15 are coupled together with each other in a central region 22 and mounted to a base 23 to contain the windowpanes 20 therebetween in a structural arrangement for use in a building. As will be appreciated, sealing structures 24 might be utilized with the mullion structures 14, 15 for sealing the interface with the windowpanes 20. The mullion structures 14, 15 are generally boxlike and include a generally planar outer surface 30 to be used as a mounting surface and opposing side surfaces 32, 34 forming respective edges 33, 35 where the side surfaces 32, 34 interface with mounting surface 30.

It will be appreciated that such structures are utilized to present glass walls or building or storefronts or doors in a variety of different combinations. Therefore, the present invention is not limited to a particular type of structure or arrangement. After installation of the various structures 14, 15, it may be desirable to run electrical wires or cables along the structures 14, 15 for use in a facility. However, since the aesthetic of the window installation is a key feature of such mullion structures, it would be unsightly to essentially secure the exposed wires along a mullion structure. To that end, system 10 of the invention provides a way of both securing and hiding wires 16 while still maintaining an aesthetically desirable appearance to the structures, such as mullion structures 14, 15.

System 10 incorporates a wire management device 40 that couples with an appropriately formed elongated cover or cover structure 42 which is appropriately secured with the wire management device 40. Once the one or more wire management devices are secured to the mullion structure 14, 15, the wires are positioned in place and secured to the device 40, and are ready to be hidden pursuant to a feature of the invention. Generally, the finish of the elongated cover or cover structure 32 matches the finish, such as a metal finish, of the mullion structures 14, 15. In that way, once the system 10 is installed, generally the appearance to an observer would be one of a typical mullion installation, or other installation as appropriate for use with the wire management system 10 of invention.

Figure 1B:
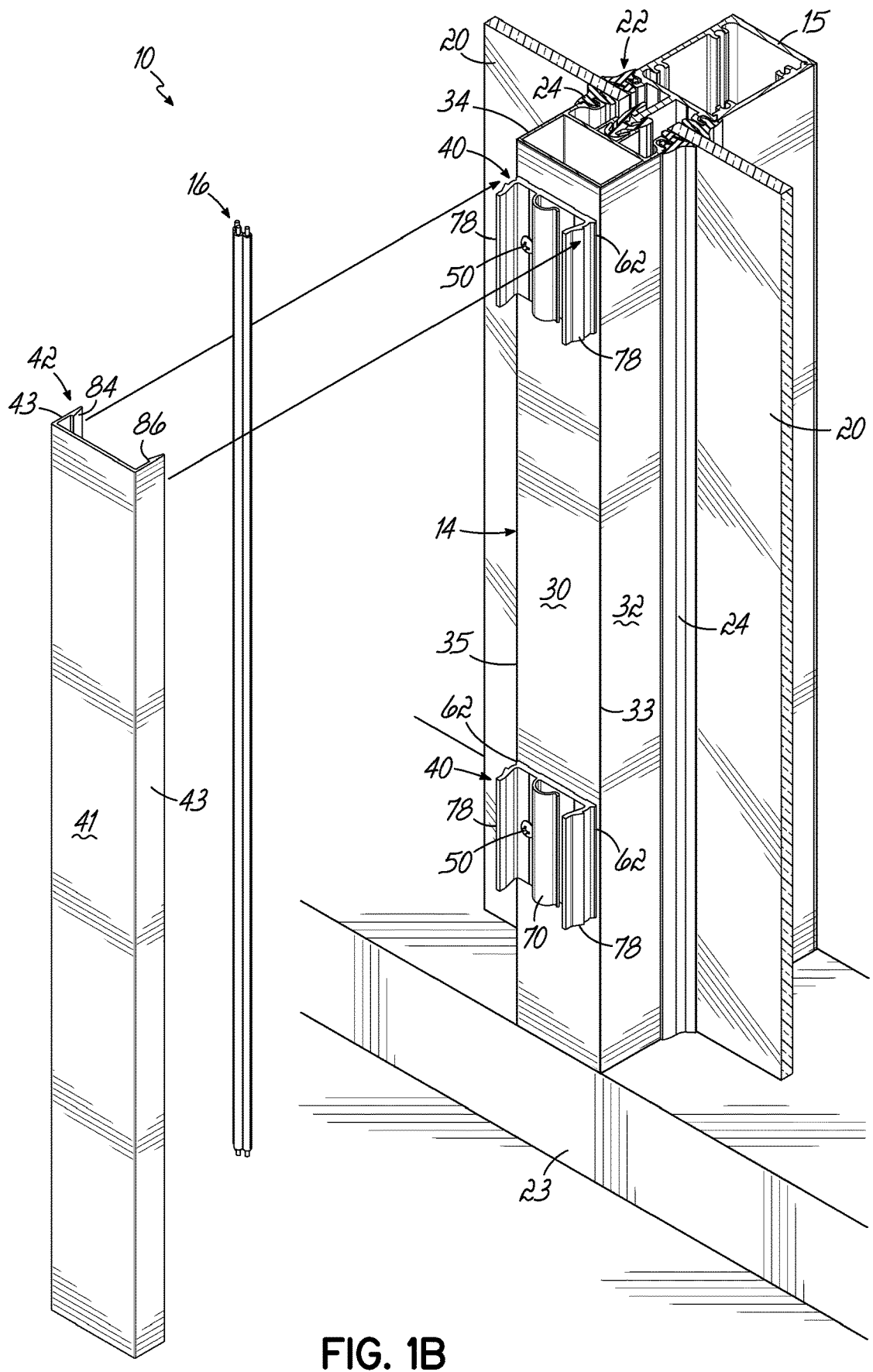
Figure 1C:
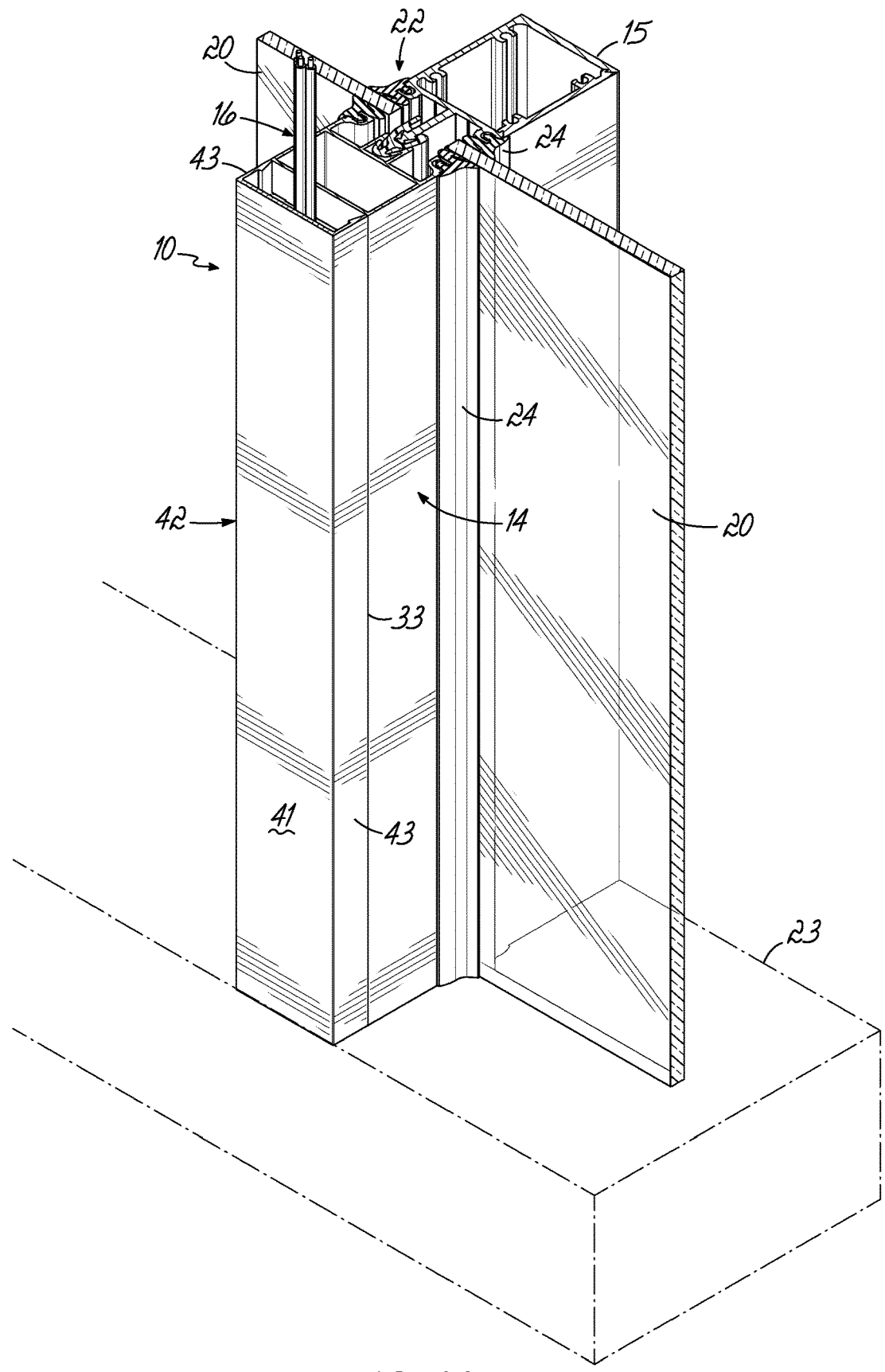

FIGS. 1A-1C illustrate an implementation of one embodiment invention. Specifically, a wire management device 40 is positioned on a mounting surface 30 of the mullion structure 14 or some other structure. The wire management device includes alignment structures on opposing sides thereof that have features, such as alignment fins, that extend over the edges 33, 35 of the structure 14 in order to center or align the device 40 on the respective mullion structure 14. The device 40 can be secured, such as with fasteners 50 (for example, screws as illustrated) in a properly aligned position. One aligned position might be a centered position on the mullion structure 14, but the invention is not limited to centering. The invention may be used for any appropriate alignment. In accordance with the invention, the alignment structures may be removed so that they are not visible in the finished or completed system.

FIG. 1B illustrates the wire management devices 40 in multiple positions along the mullion structure 14 and fastened thereto in a centered or aligned arrangement. Then, the wires 16 may be placed under wire management structures 70 that extend generally along the length of the wire management device 40. Thereafter, the cover structure 42 is placed over the devices 40 and wires 16 and is coupled to the wire management device 40 as illustrated in FIG. 1C to present a completed structure 14 wherein the wires 16 and device 40 are hidden. As noted, the cover structure 42 will generally have the same finish as the mullion structure 14 and so will look like a unitary structure while still hiding the wires 16. Cover structure 42 and wire management device 40 would include opposing and cooperating clip structures (as discussed herein) that provide for a secure fastening of the cover structure 42 with the wire management device 40 as illustrated in FIG. 1C.

Turning now to FIGS. 2 and 3, perspective views of a wire management device 40 in accordance with one embodiment of the invention is illustrated. The wire management device is configured for mounting to a structure having a mounting surface 30 and one or more edges 33, 35 against which the wire management device can be aligned. In the embodiment illustrated in FIG. 2, the wire management device 40 includes a base portion 60 which in the illustrated embodiment is a generally a planar base plate. The planar base plate 60 has opposing side edges indicated generally by reference numerals 62. The base plate 60 also includes a front face 64 and a rear face 66 as shown in FIG. 3. The rear face 66 is configured for engaging a mounting surface 30. In the use with the mullion structure 14, the mounting surface 30 is flat and therefore generally the rear face surface 66 will be configured to lie flat against the mounting surface 30. On the front face surface 64, a wire management structure 70 extends forwardly from the front face surface 64. The wire management structure 70 is configured for capturing at least one elongated wire or cable to secure a portion of the wire with the wire management device 40. The wire management structure 70 may take a number of different forms for capturing a cable or wire. In the embodiment illustrated in FIGS. 2 and 3, the wire management structure 70 is in the form of a generally cylindrical loop or clip that curves away from the face surface 64 and then back to the face surface.

The wire management structure 70 is connected along an edge 72 with respect to the base plate 60 and has an open edge 74 opposite connecting edge 72. The wire management device 40 is formed of a suitably flexible material, such as a suitable plastic, for example, and thus the wire management structure 70 is flexible so as to flex along edge 72 to move the open edge 74 away from the front face surface 64 to allow one or more wires as illustrated in FIG. 1A to be slid up and under the wire management structure and to be held against base plate 60. The wires are specifically held and secured against the front face surface 64, as illustrated herein. As will be readily understood by a person of ordinary skill in the art, the wire management structure can take a number of different forms for clipping or capturing the wires with the wire management device 40 and therefore the invention is not limited to the specific shape or dimension of the wire management structure 70. For example, the wire management structure 70 may not extend along the total length of the base plate, but may be provided by one or more shorter sections or clips that are secured along respective edges 72 with respective open edges 74.

For securing the cover structure 42 with the wire management device 40, such as in a finished installation, the wire management device 40 includes clip structures 78 that extend forwardly from the side edges of the base plate 60. In the embodiment of the invention as illustrated in FIGS. 2 and 3, the wire management device 40 includes clip structures 78 that extend forwardly from both of the opposing side edges 62 of the base plate. That is, the cover structure 42 is secured with wire management device 40 at both edges. As discussed herein, other embodiments of the invention incorporate various other clip structure arrangements. In the embodiment shown in FIGS. 2 and 3, the clip structures 78 have a similar form and incorporate sloping surfaces 80 that slope toward the base plate and terminate generally in a shoulder structure 82 for providing retention of the cover structure 42 with the wire management device as further discussed herein. More specifically, as illustrated in FIG. 4C, the cover structure 42 incorporates similar sloping surfaces 84, terminating in shoulder structures 86 to form opposing clip structures that cooperate with the clip structures 78 of the wire management device 40 in order to secure the cover structure with the wire management device. Again, the clip structures of cover structure 42 formed by surface 84 and shoulder 86 are not limiting with respect to the invention, and various different opposing clip structures on the wire management device 40 and cover structure 42 might be utilized for retaining the cover structure 42 with the wire management device 40.

In accordance with another feature of the invention, the wire management device 40 includes at least one alignment structure that is positioned proximate at least one side edge 62 of the base plate 60. The alignment structure is configured for engaging the structure 14 to which the wire management device is mounted for positioning the wire management device 40 thereon. More specifically the alignment structure is configured for engaging an edge 33, 35 of the mounting surface 30 to position and align a side edge 62 of the base plate 60 with respect to the mounting surface edges 33, 35 and the overall mounting surface 30. In the embodiment illustrated in FIGS. 2 and 3, the wire management device 40 incorporates alignment structures proximate each of the side edges 62 of the base plate 60 and thus aligns or centers the base plate 40 on surface 30 as illustrated herein. Specifically, referring to FIG. 1B, when wire management device 40 is properly mounted on surface 30 it is centered on that surface. This positions the clip structure 78 also at the edges so that when the cover structure 42 is secured, it is also centered on the mullion structure 14. In that way, as illustrated in FIG. 1C, the cover structure 42 looks like it is part of the mullion structure 14 as it is properly centered thereon to extend away from that mullion structure 14 and cover the wire management devices 40 as well as the wires held by those wire management devices.

Referring again to FIGS. 2 and 3, the alignment structures 90 are shown along each of the side edges 62 of the base plate 60. The alignment structures 90 each include a positioning or alignment feature in the form of an alignment fin 92 that extends along the edge of the alignment structure 90 and generally perpendicular to a plane of the base plate 60 and perpendicular to the mounting surface 30. In that way, as shown in the drawings, the alignment fins 92 engage respective edges 33, 35 and extend along the side surfaces 32, 34 of the mullion structure 14. The alignment structures 90 are positioned proximate the side edges 62 and are configured with respect to the width of the mullion structure 14 so as to capture the opposing edges 33, 35 and thereby center the base plate 60 over surface 30 and specifically center the base plate 60 on the mullion structure 14. (See FIG. 4B.) In one illustrated embodiment of the invention as shown in FIG. 4A, the alignment features 90 are in the form of fins 92 that extend along the length of the base plate 60 generally perpendicular to the plane of the base plate.

Figure 4A:
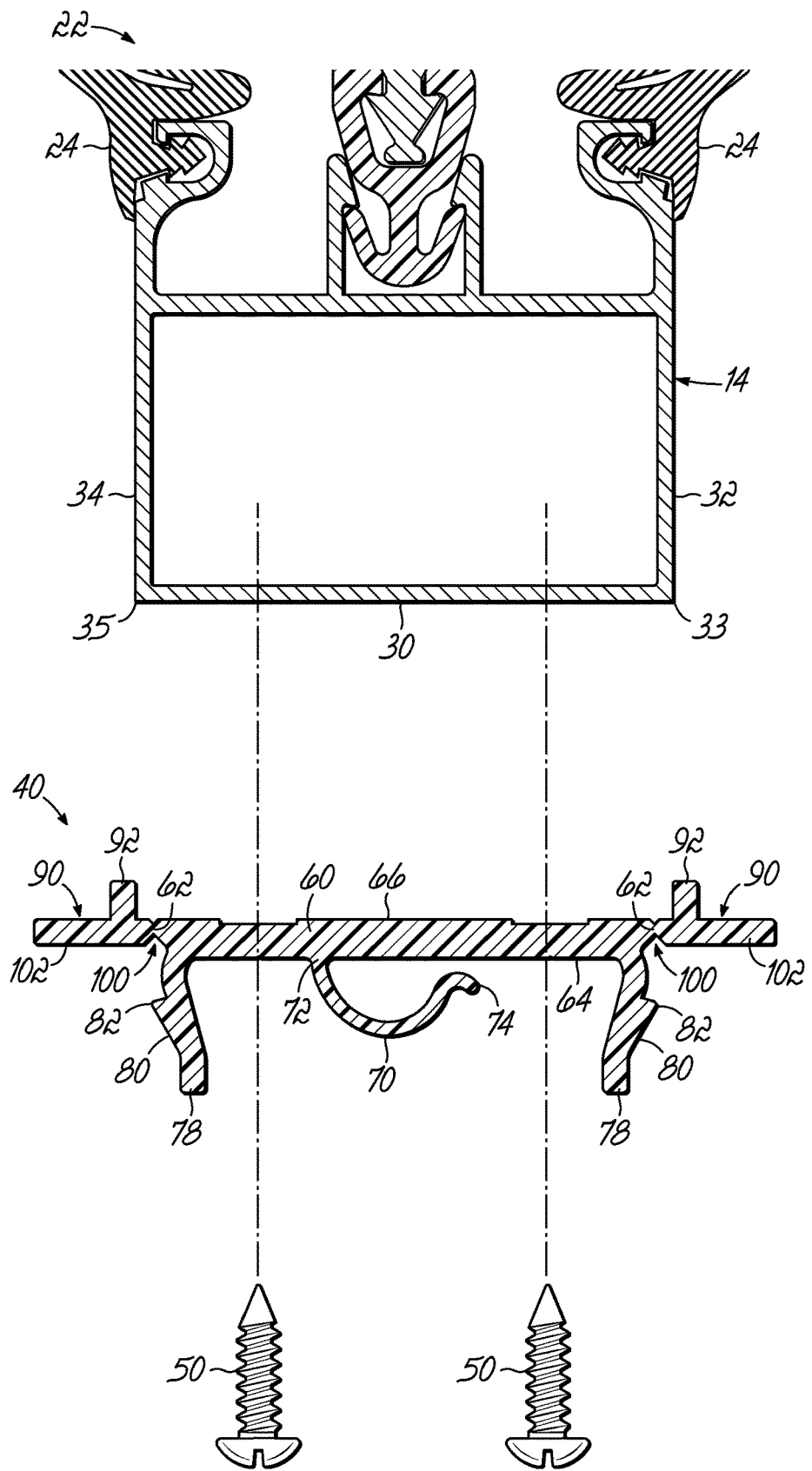
FIGS. 4A-4E are top cross-sectional views of an installation of a wire management device in accordance with an embodiment of the invention as shown in FIG. 1.
Figure 4B:
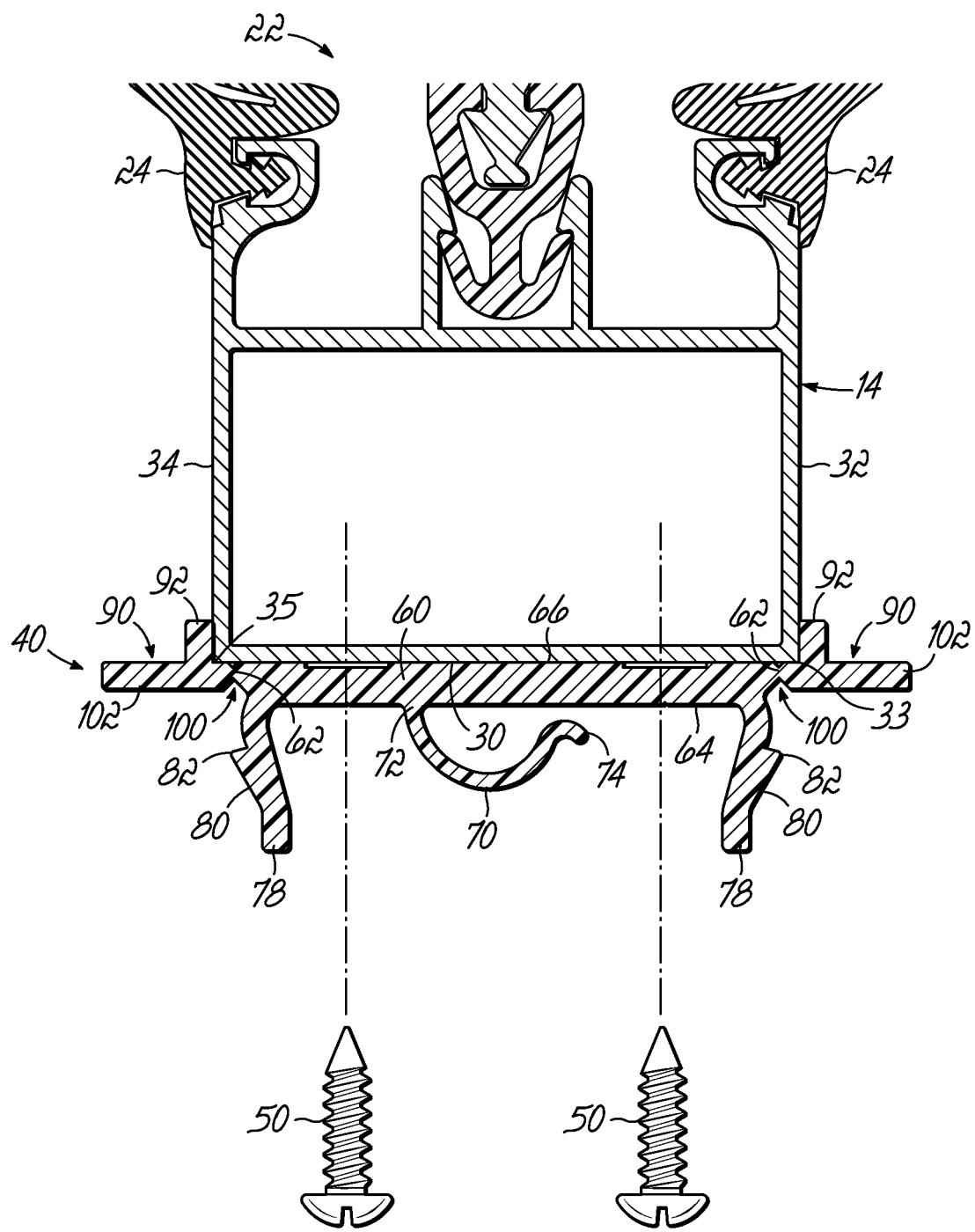
Figure 4C:
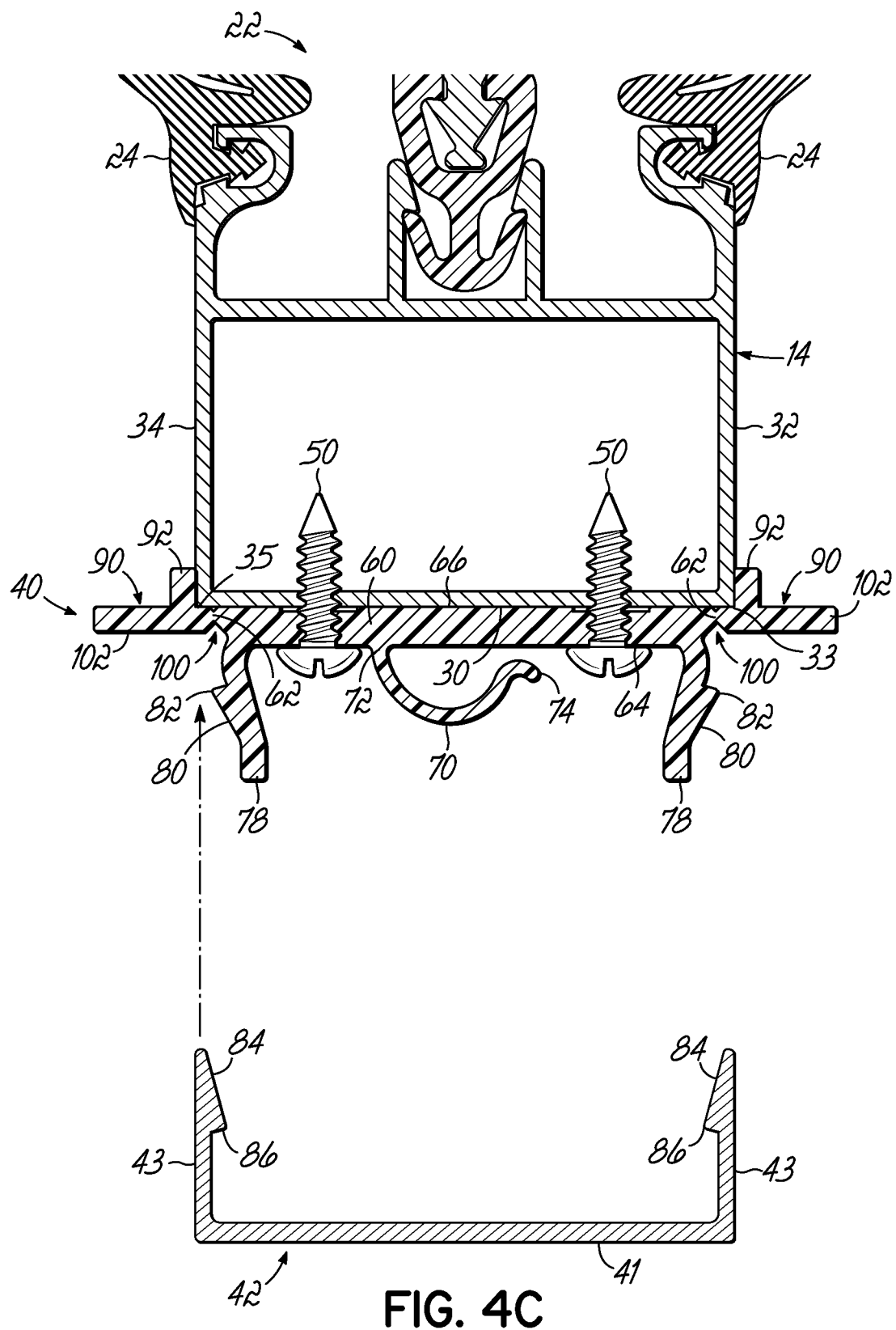
Figure 4D:
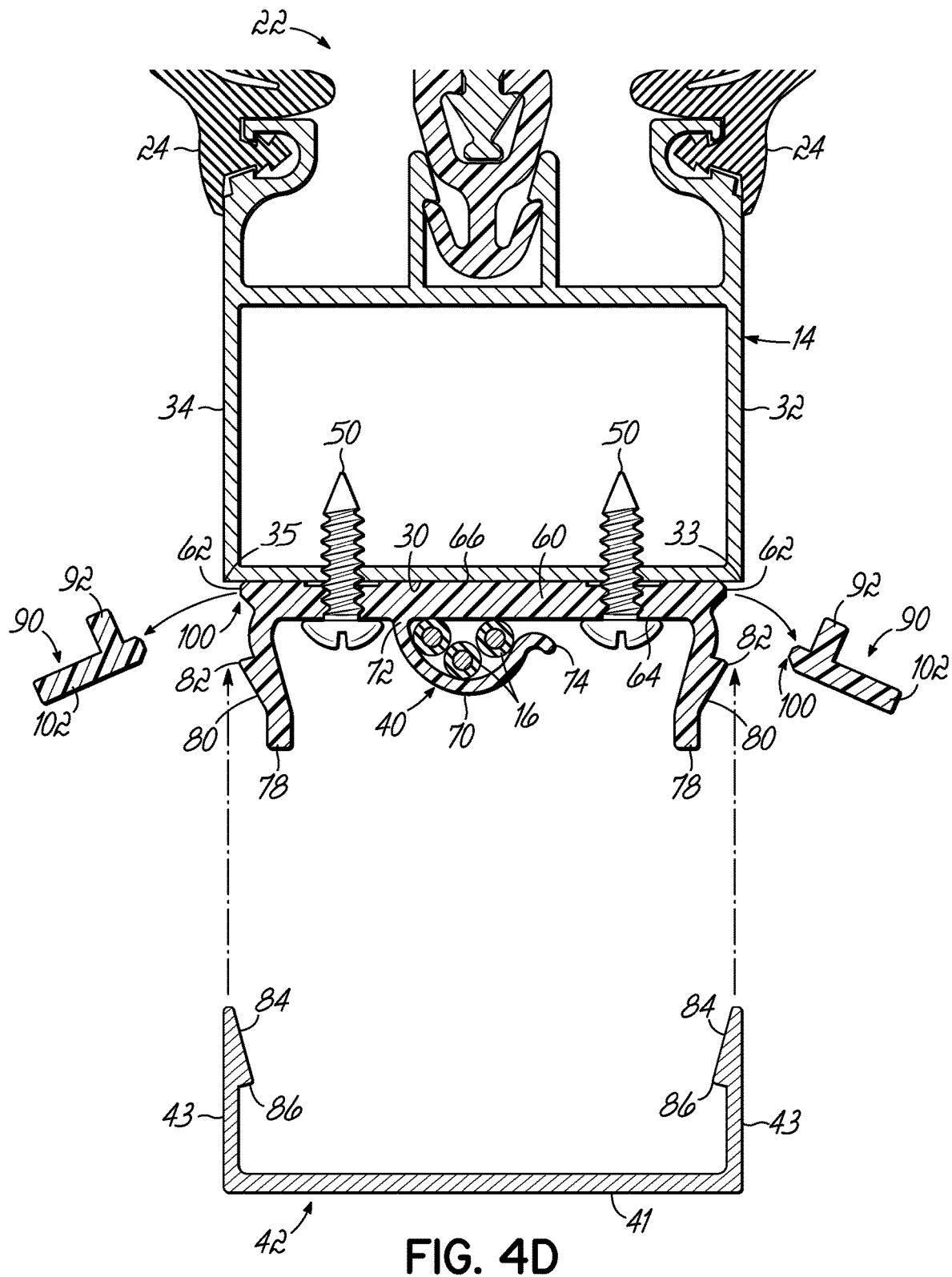

In accordance with another feature of the invention, as illustrated in FIG. 4D, the alignment structure is breakable from the base plate 60 for being separated and removed from the base plate. More specifically, as illustrated in FIGS. 2, 3 and 4A, the wire management device 40 includes a frangible section 100 at the edge 62 attaching each alignment structure 90 and the base plate 60. The frangible section 100 is breakable, such as along edge 62, separating the alignment structure 90 from the base plate. As illustrated in one embodiment, the frangible section 100 extends generally along the length of the base plate and along the length of the edge 62. As illustrated in FIGS. 4A-4D, the alignment feature of an alignment structure 90, such as fin 92, is positioned proximate to the frangible section 100 and proximate to edge 62 to center the base plate. In that way, when the alignment structure is broken away from the base plate, the edges 62 of the base plate are aligned with and generally parallel to the edges 33, 35 of the mullion structure 14. That is, the edges 62 of the base plate of wire management device 40 are generally parallel along the mullion structure 14 and the base plate is centered between the edges 33, 35. As noted, the alignment structures might be otherwise positioned on the device if another alignment, other than a centered alignment is desired.

In accordance with another feature of the invention, the alignment structure 90 incorporates grip portions 102 that extend away from the alignment features 92 and generally away from the mullion structure 14 when the wire management device 40 is mounted thereon. The grip portions 102 may be gripped by an installer, such as with hands or a pliers, to break the alignment structure 90 from base plate 60. That is, the grip portions 102 can be used to bend or flex the alignment structure 90 proximate to the frangible section 100 and edge 62. Such bending and flexing at the weakened point of the frangible section provides a clean break along edges 62 for separation of the alignment structure from the base plate 60 once installation is complete and the base plate is attached to the mullion surface 30.

Turning now to FIGS. 4A-4D, installation of the wire management device of the invention is illustrated. Referring to FIG. 4A, wire management device 40 is placed against mullion structure 14 such that the rear face surface 66 of the base plate lies against mounting surface 30 of mullion structure 14. To allow for a flush fitting of surface 66 to surface 30, the alignment fins 92 must be positioned wide enough on base plate 60 to extend past the corners 33, 35 and along the respective side surfaces 32, 34 of the mullion structure. In that way, turning to FIG. 4B, the two alignment structures 90 control the location or position of the base plate 60 on surface 30 to prevent improper mounting of the wire management device. In particular, the alignment fins 92 center the base plate 60. As may be appreciated, in the installation illustrated if the wire management device 40 was is not centered, the cover structure 42 would not be centered on the mullion structure 14. The result would be one of the edges 33, 35 of the mullion structure 14 being exposed while the other edge would be covered or overlapped by the cover structure 42 thus presenting an unsightly mount and mullion structure.

Turning again to FIG. 4B, the base plate, which generally has a width matching the width of the mullion structure 14 will be centered on the mullion structure for proper mounting of the cover structure 42. The sides of the cover structure will be continuous with the sides of the mullion structure. The alignment fins 92 extend generally perpendicular to the plane of the base plate 60 and extend to lie generally flush with the side surfaces 32, 34 as shown for providing proper positioning of base plate 60.

Once the wire management device, and specifically the base plate 60 has been centered or otherwise positioned on the mullion structure 14, the wire management device 40 may be secured with the mullion structure 14, such as by screws or other fasteners 50 which extends through the base plate 60 and into surface 30. The fins help the device 40 to remain in place as fasteners are applied. In one embodiment of the invention, the fasteners 50 may be self penetrating screws that will cut into and proceed through the material of the wire management device base plate 60 and also the material of the mullion structure 14. The alignment fins 92 ensure proper positioning while the fasteners are screwed in the mullion structure.

Figure 4E:
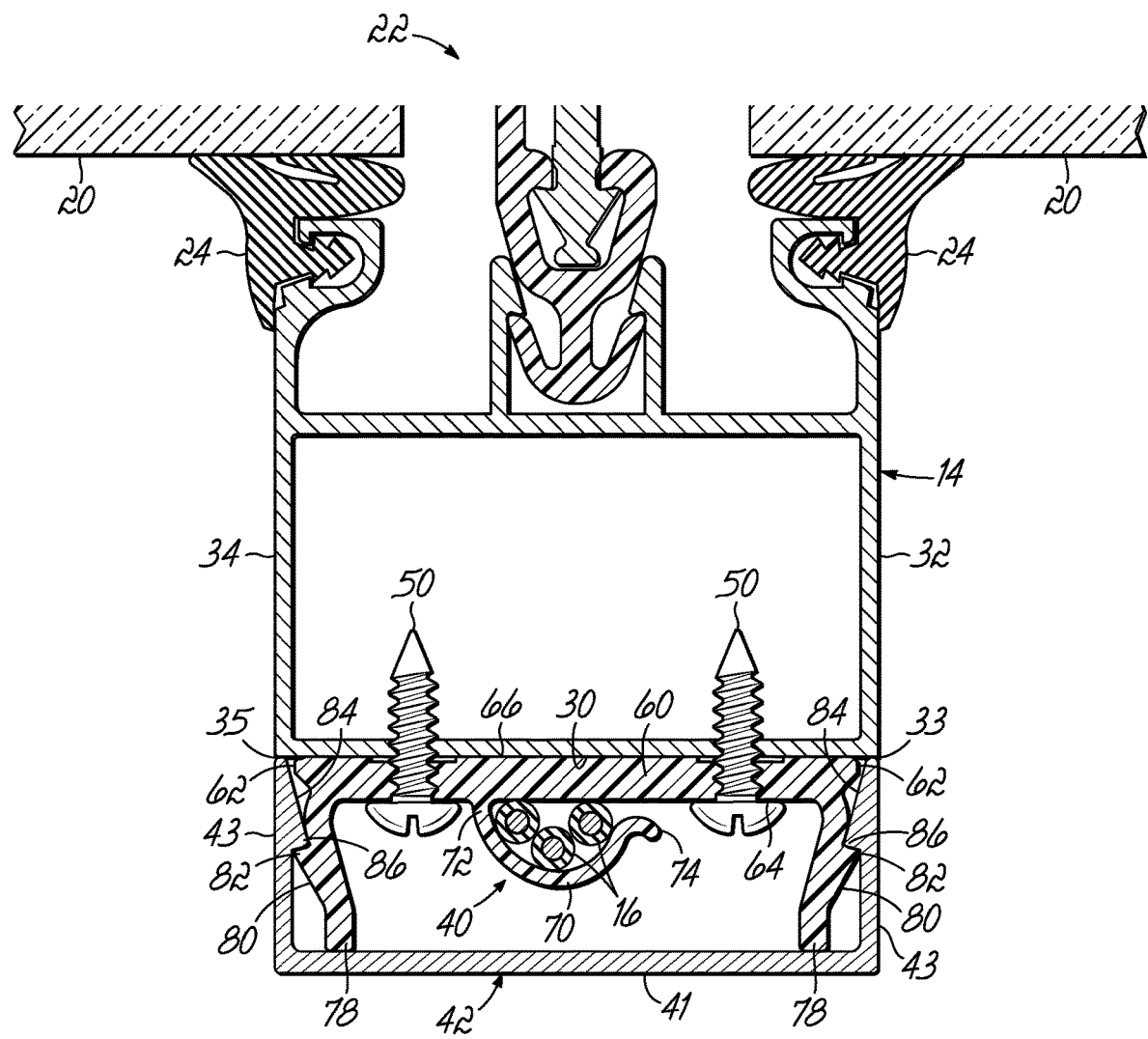

Referring to FIG. 4C, once the wire management device 40 has been secured to the mullion structure 14, cover structure 42 may be clipped to the clip structures 78 that extend forwardly from base plate 60. As noted, cover structure 42 may have similar clip structures that align with and engage the clip structure 78 of the wire management device. As illustrated in FIG. 4C, surfaces 84 of cover structure 42 may slide along surfaces 80 of the wire management device 40 until the respective shoulders 82 and 86 are engaged to hold the cover structure 42 against the wire management device 40. As may be appreciated, the clip structures 78 may flex with respect to base plate 60 and may flex inwardly to allow the cover structure 42 to clip on or otherwise be secured with the wire management device 40 as illustrated in FIG. 4E.

Referring to FIG. 4D, before clipping the cover structure 42 with the wire management device 40, the wires or other structures to be held by wire management structure 70 should be appropriately secured by that structure 70, such as being slid under the open edge 74 as shown. Wire management structure 70 is also made of a material and configured to flex away from the base plate 60 along edge 72 for capturing the wires.

The installer can then grip the alignment structures 90 at base plate 102, such as with pliers or other tools or manually, and bend or flex the structures 90 at edge 62 and the frangible section 100 that connects the alignment structure 90 in the base plate 60 along edge 62. When the alignment structures 90 are broken from the base plate 60, they can be separated and removed as shown in FIG. 4D. The edge 62 and location of the frangible section 100 may be configured such that when the alignment structure is removed, the edge 62 sits slightly away from or inside of the edges 33, 35 of the mullion structure 14. That is, the width of the baseplate 60 between edges 62 and the frangible sections may be slightly more narrow than the width of the mullion and surface 30. The cover structure 42 may then readily be secured, such as through engagement of the noted surfaces 84 and shoulders 86 to cover the wire management device 40, the wires 16 and mounting fasteners 50 as illustrated in FIG. 4E. Cooperating clip structures on both the wire management device 40 and the cover structure 42 secure the cover structure in position. Since the wire management device 40 is centered and the edges 33, 35 are aligned with the side edges 62 of the base plate, the sides 43 of the cover structure are aligned with side surfaces 32, 34 of the mullion structure. Specifically, as seen in FIG. 4E, cover structure 42 includes a face surface 41 and side surfaces 43. Because the wire management device 40 has been properly aligned through the alignment structures 90, when the assembly is complete, surfaces 43 are flush and generally planar and co-extensive with the side surfaces 32, 34 of the mullion structure 14 and the entire assembly as illustrated in FIG. 4E looks like an extended mullion structure. The wires 16 and fasteners 50, as well as the wire management device 40 are all hidden.

Figure 5:
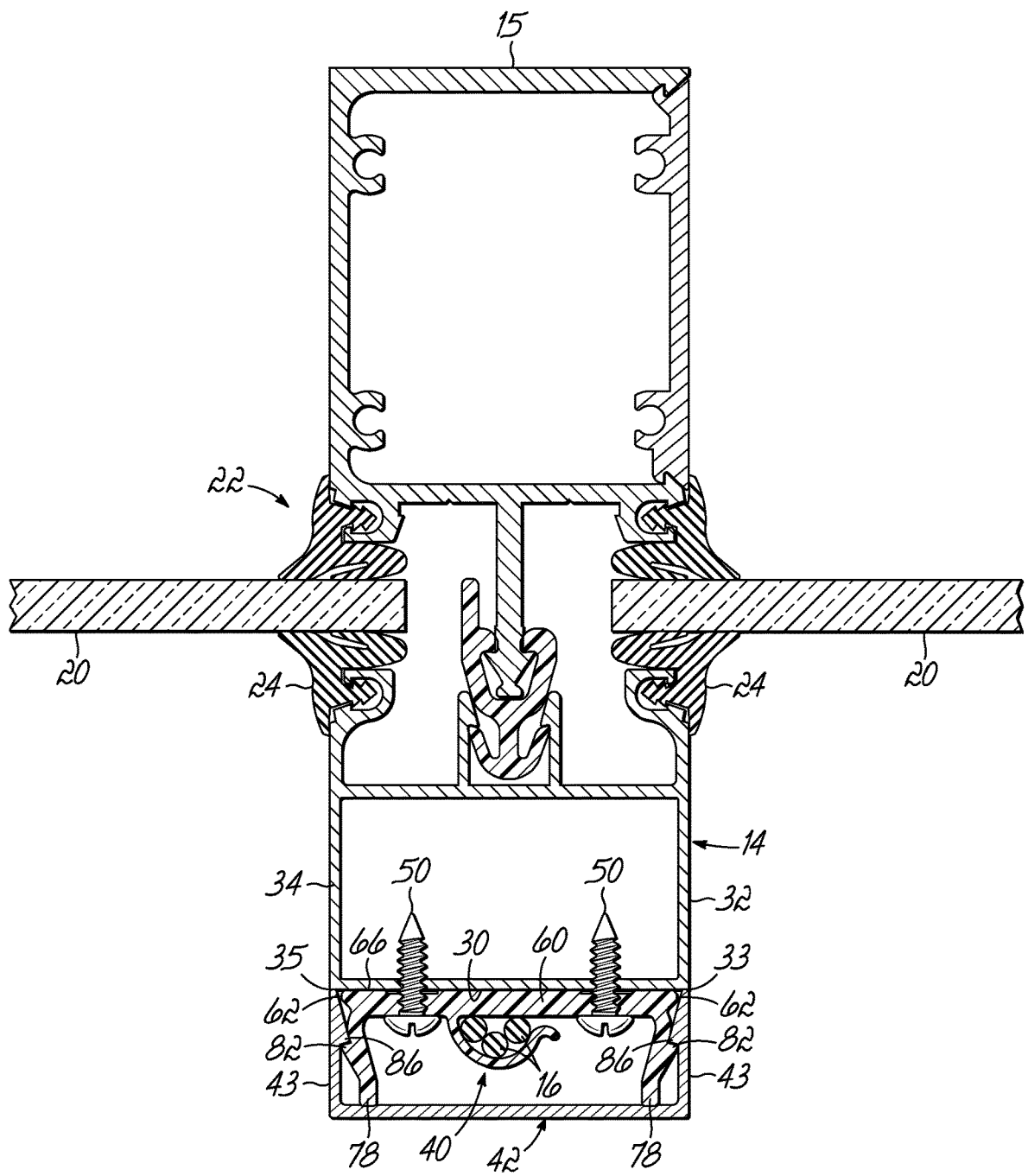
FIG. 5 is a top cross-sectional view of a complete installation of a wire management device in accordance with an embodiment.

FIG. 5 illustrates the complete assembly showing the wire management device 40 coupled with cover structure 42 on the mullion structure 14 with wires 16 secured and hidden.

Figure 10:
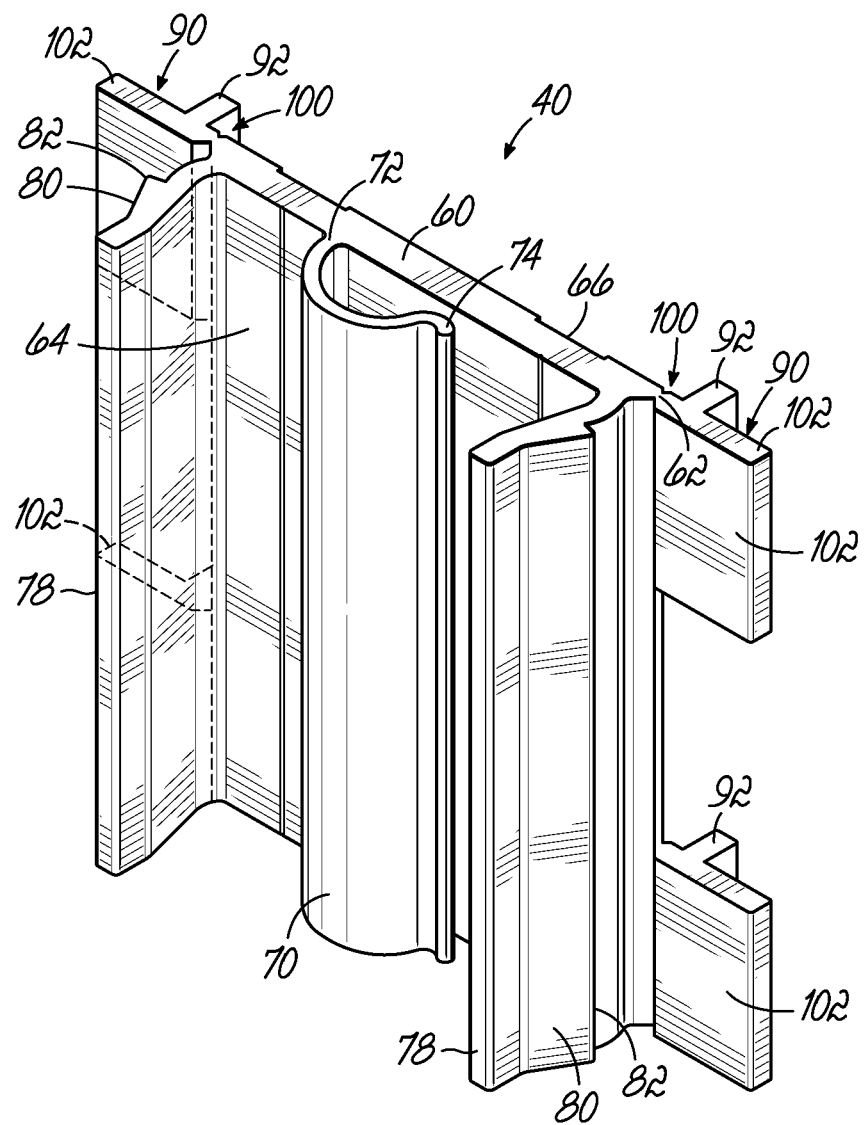
FIG. 10 is a front perspective view of a wire management device in accordance with another embodiment of the invention as shown in FIG. 1.

Referring to FIG. 1B, depending upon the length of the mullion structure or the height thereof as installed, a plurality of wire management devices 40 may be implemented along the mullion structure for securing and hiding wires 16. Depending upon the overall length of each of the wire management devices 40 a greater or lesser number of such devices might be utilized in a particular installation. Although various elements of the wire management device such as the wire management structure 70, the clip structures 78 and the alignment structures 90 are illustrated to extend along generally the entire length of the wire management device. Such elements might be shorter or even longer than the length of the wire management device or base plate 60. For example, each of the structures 70, 78 and 90 may include a plurality of shorter structures that are aligned along the length of the base plate to provide for each function. For example, FIG. 10 illustrates a wire management device having a plurality of shorter alignment structures 90 that extend along the length of the wire management device 40*b* to ensure proper alignment. The alignment structures can then be broken away from the base plate 60 for being separated to complete the installation as described herein.

FIGS. 6-9B illustrate an alternative embodiment of the invention wherein the structure to which the invention is mounted is in a corner or wherein one side of the structure on which the invention is mounted is up against another structure. For example, referring to FIG. 6, a mullion structure 14 may be mounted up against another wall structure 120 as illustrated.

Figure 6:
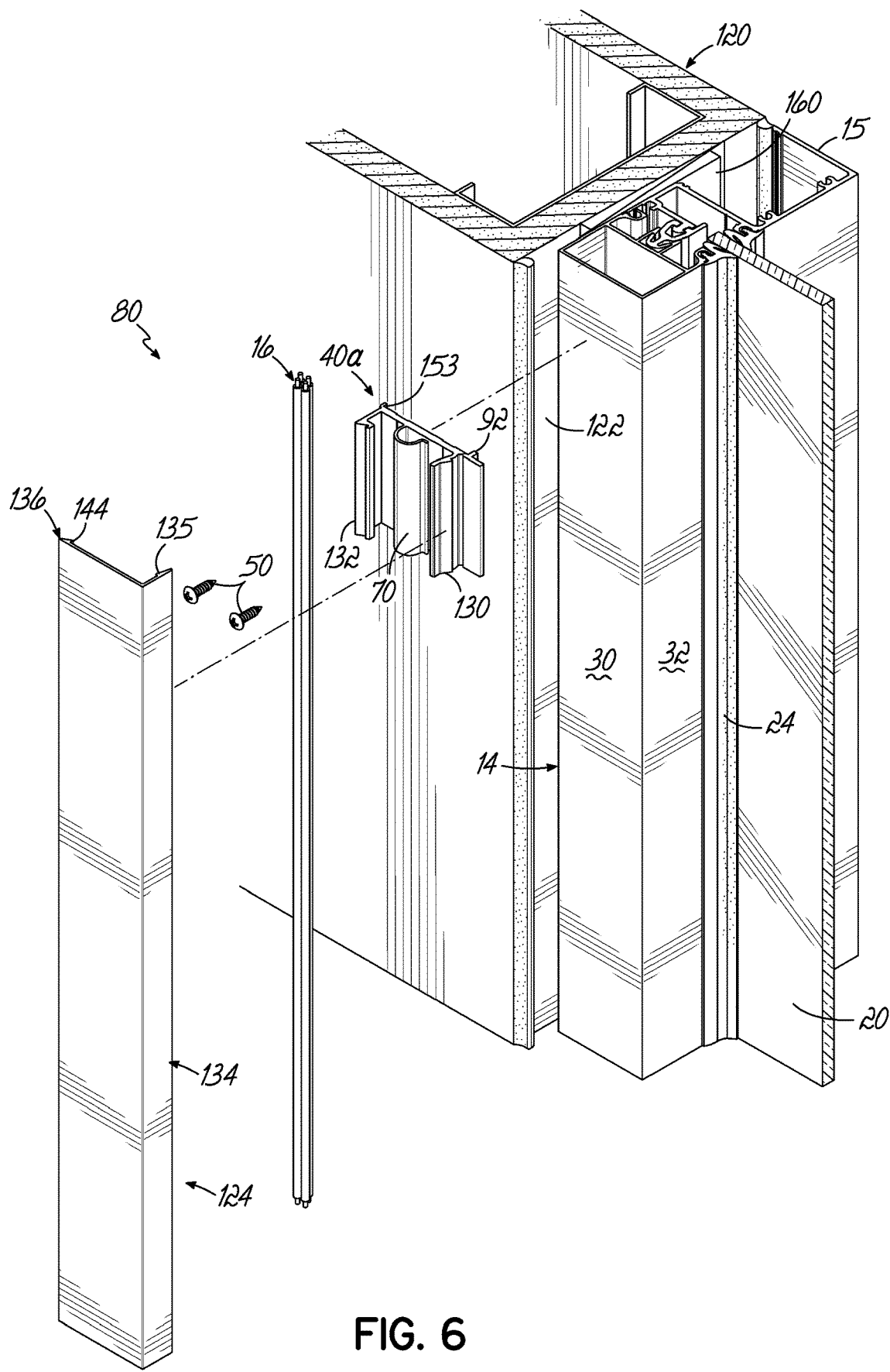
FIGS. 6-7 are perspective exploded views of an installation of a wire management device in accordance with another embodiment of the invention.
Figure 8:
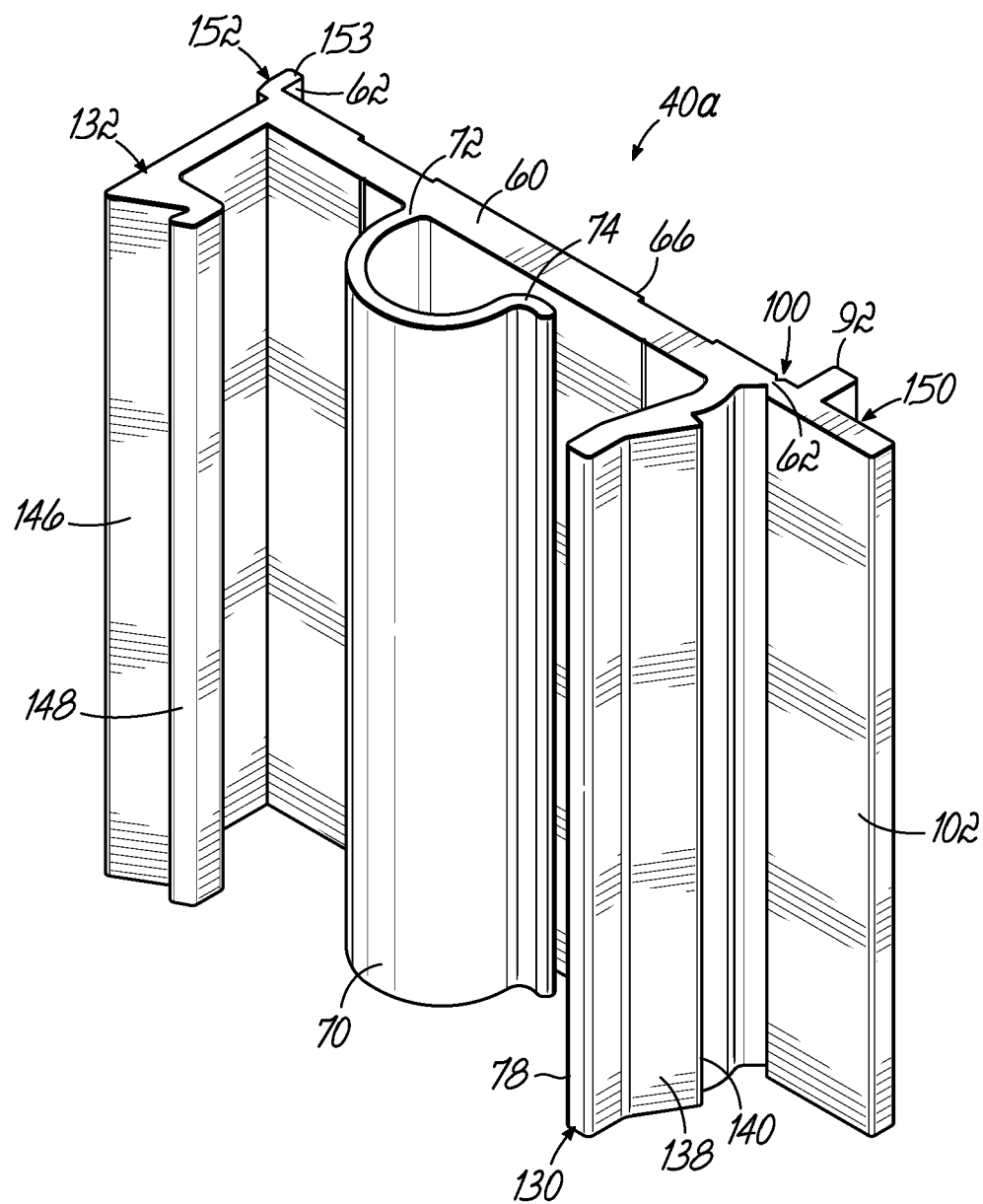
FIG. 8 is a front perspective view of a wire management device in accordance with an embodiment of the invention as shown in FIG. 6.

More specifically, side surface 34 of the mullion structure 14 sits up against surface 122 of the wall structure 120. As such, the cover structure 124 only has to cover a portion of the mullion structure 14 away from the wall surface 122. Accordingly, the clip structures utilized with the wire management device 80 may be rearranged and only a single breakable alignment structure would be necessary. Referring again to FIG. 8, a wire management device 40*a* is illustrated. With respect to the device 40*a* sharing similar construction as wire management device 40, like reference numerals are utilized. Referring to FIG. 8, the wire management device 40*a* includes a base plate 60 having edges 62 with the wire management structure 70 and clip structures 130 and 132 for connecting with a cover structure 124 as illustrated in FIG. 6. The clip structure 130 may be similar to clip structure 78 as shown in FIGS. 2 and 3. However, clip structure 132 may take a different form based upon the orientation of the wire management device against the wall surface 402 and the construction of the cover structure 124.

Figure 9A:
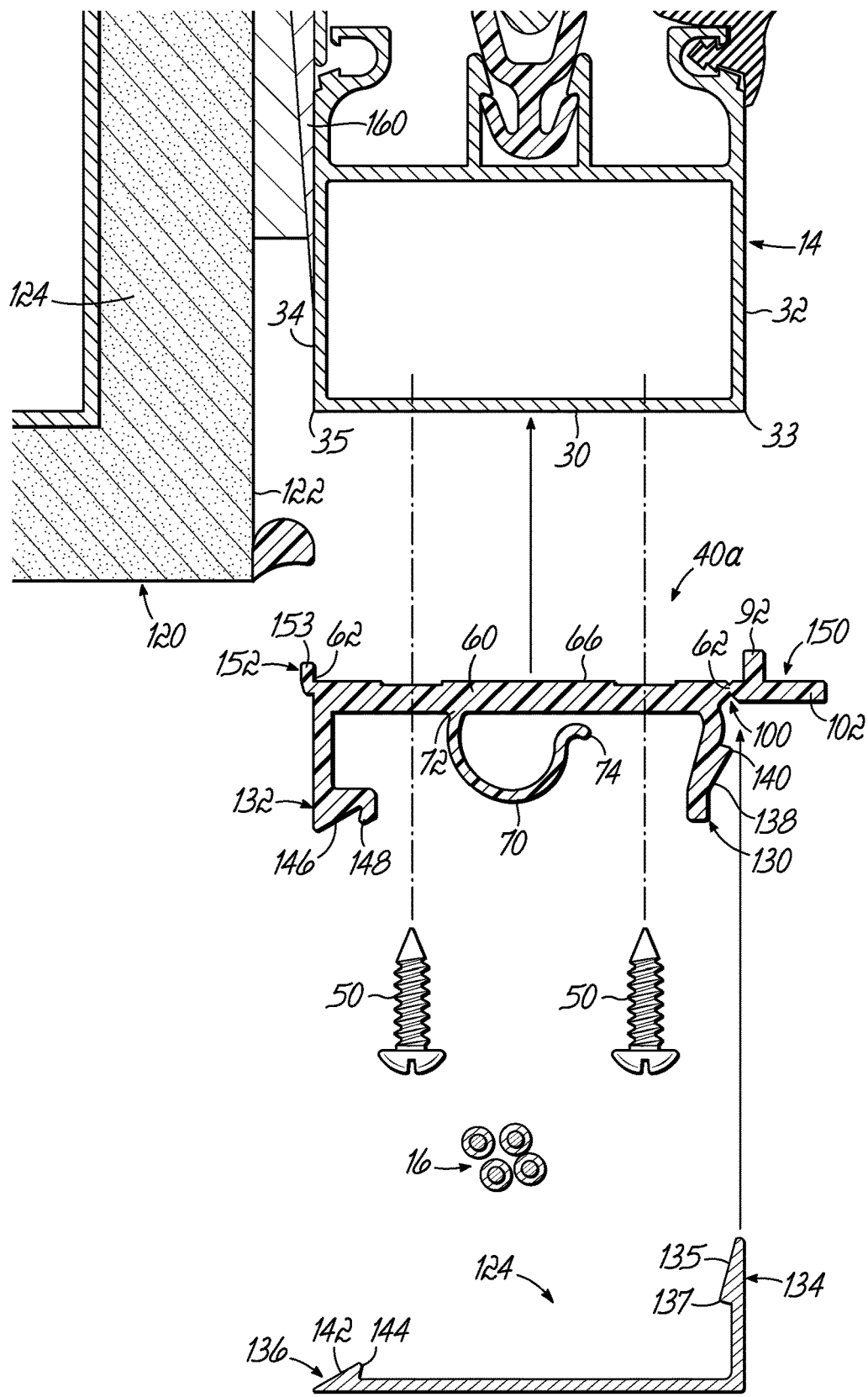
FIGS. 9A and 9B are top cross-sectional views of an installation of a wire management device in accordance with an embodiment of the invention as shown in FIG. 1.
Figure 9B:
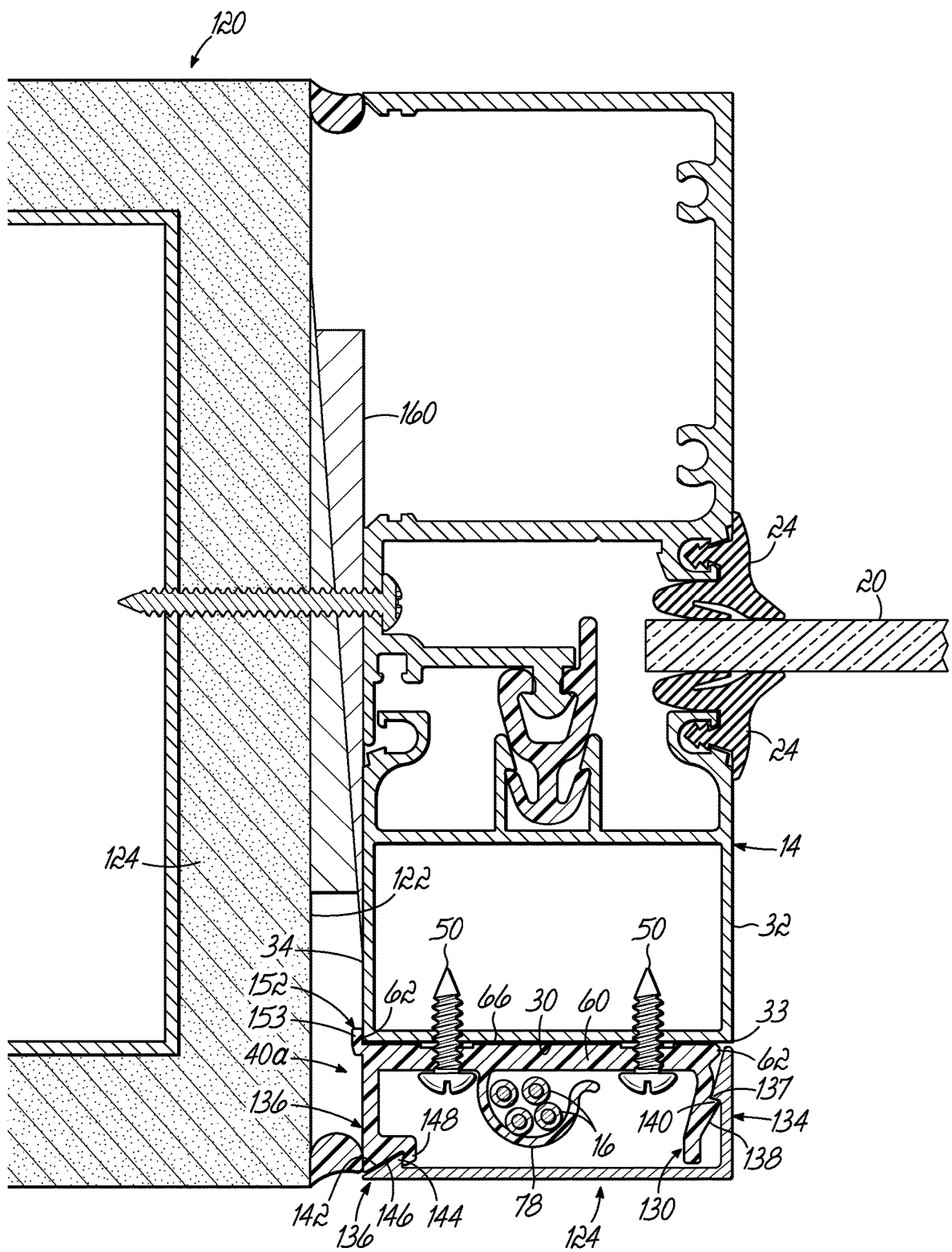

Particularly, as illustrated in FIG. 9A, the cover structure 124 incorporates a counterpart clip structure 134 that includes a sloped surface 135 and a shoulder 137 and engages a similar slope surface 138 and shoulder 140 on clip structure 130 as shown in FIG. 8. The two opposing clip structures engage each other as illustrated in FIG. 9B. Alternatively, the clip structure 136 on the cover structure 124 incorporates a slope surface 142 and shoulder 144 that engage a slope surface 146 and shoulder 148 of the clip structure 132 formed on wire management device 40a. The clip structure 132 is oriented at a plane that is generally parallel to the plane of the base plate 60 as shown in FIG. 9A. As such, when clip structure 136 of the cover structure 124 engages the wire management device for covering the device and the wires held thereby, the clip structure engages in that parallel plane versus in a perpendicular plane as illustrated in FIG. 9A for clip 134. Accordingly, in accordance with one aspect of the invention, the various clip structures 130, 132 on a wire management device might be oriented in different directions based upon a particular installation and therefore the invention is not limited to how the wire management device engages a cover structure 124 or other cover.

Figure 7:
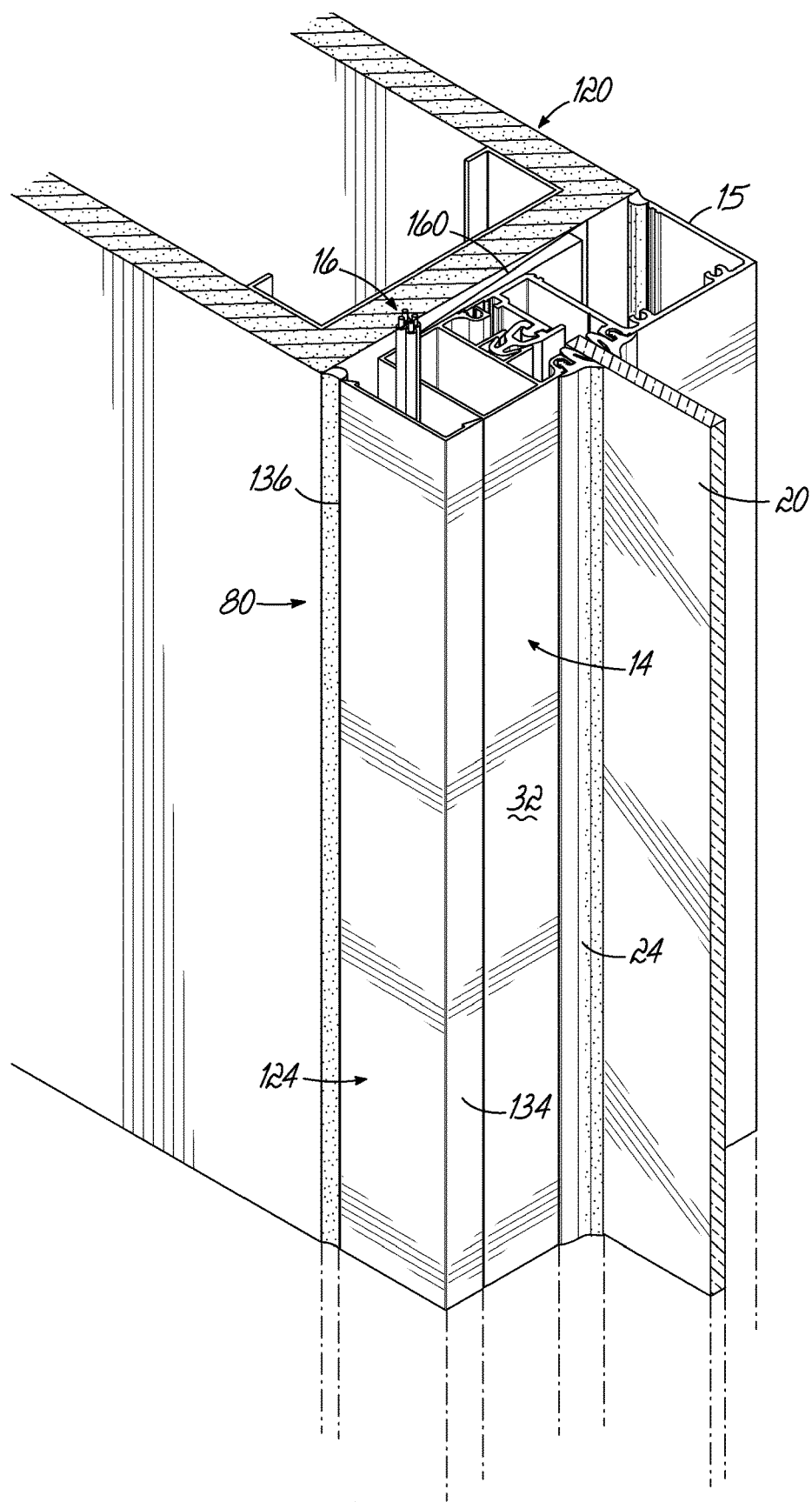

FIGS. 6 and 7 illustrate the clip structure 40a being installed and then a completed installation respectively. Referring to FIG. 9A, the wire management device 40a incorporates two alignment structures 150 and 152.

The alignment structure 150 is similar to alignment structures 90 as illustrated in the embodiment of FIGS. 2 and 3. That is, a frangible section 100 is positioned at edge 62 of the base plate 60 such that through leverage on a grip portion 102, the alignment structure may be broken away from the base plate 60 to be separated from the wire management device 40a. That is, the breakable alignment structure is only positioned on one edge of the wire management device. On the other edge, an alignment structure 152 incorporates an alignment fin 153 that extends generally perpendicular to the base plate 60 and in a direction generally perpendicular to the mounting surface 30. Similar to the alignment fin 92 of alignment structure 150, the alignment fin 153 abuts against an edge of the mullion structure 14 and cooperates with alignment fin 92 to ensure that the base plate 60 is secured on the base surface 30 of the mullion structure 14.

The alignment fin 153 remains in place on the wire management device 40A and is not removed since the cover structure 124 will engage clip structure 132 at a different orientation than cover structure 42 of the embodiment of the invention illustrated in FIG. 1A.

Referring now to FIG. 9B, when the wire management device 40a has been secured, such as with appropriate fasteners 50, the breakable alignment structure 150 is broken away from the base plate 60 along edge 62 and the cover structure 124 is clipped onto or otherwise secured with the wire management device 40a as illustrated in the figure. That is, the various clip structures 134, 136 interface with the clip structures 78, 132 to secure the cover structure 124 into the complete assembly as illustrated in FIG. 9B. In that way, the wire management device and cover structure 124 look as if they are an extension of the existing mullion structure 14 allowing the mullion structure to be mounted closely to the wall surface 122. As shown in FIG. 9B, one or more shims 160 may be implemented when mounting mullion structures 14, 15 proximate to the wall structure 122. As illustrated in FIGS. 7 and 9B, the present invention provides securement of the wires 16 in the mullion structure while still providing a clean and aesthetically pleasing finished structure that closely resembles just the basic mullion structure.

While the present invention has been illustrated by a description of various embodiments and while these embodiments have been described in some detail, it is not the intention of the inventors to restrict or in any way limit the scope of the appended claims to such detail. Thus, additional advantages and modifications will readily appear to those of ordinary skill in the art. The various features of the invention may be used alone or in any combination depending on the needs and preferences of the user.

What is claimed is:

1. A wire management device for mounting to a structure having a mounting surface with an edge, the wire management device comprising:
    a planar portion having opposing side edges, a front face and a rear face that is configured for engaging the mounting surface;
    a wire management structure coupled to extend from the front face and configured for capturing at least one elongated wire to secure a portion of the at least one wire with the wire management device;
    an alignment structure positioned proximate at least one side edge of the planar portion, the alignment structure configured for engaging an edge of the mounting surface to align a side edge of the planar portion with respect to the mounting surface edge;
    the alignment structure being breakable from the planar portion for being separated from the planar portion;
    a separate cover structure, the cover structure configured for engaging a portion of the wire management device to secure the cover structure with the wire management device.

2. The wire management device of claim 1 further comprising, a clip structure extending forwardly from at least one side edge of the planar portion, the cover structure configured for engaging the clip structure to secure the cover structure with the wire management device.

3. The wire management device of claim 1 further comprising an alignment structure positioned proximate two opposing side edges of the planar portion, the alignment structures configured for engaging multiple edges of the mounting surface to align the opposing side edges of the planar portion with respect to the mounting surface edges, each of the alignment structures being breakable from the planar portion for being separated from the planar portion.

4. The wire management device of claim 1 further comprising a frangible section connecting the alignment structure and the planar portion, the frangible section being breakable for separating the alignment structure.

5. The wire management device of claim 1 wherein the alignment structure includes an alignment feature extending generally perpendicular to the planar portion, the alignment feature configured to engage an edge of the mounting surface to position the wire management device on the mounting surface.

6. The wire management device of claim 5 further comprising a frangible section connecting the alignment structure and the planar portion and breakable for separating the alignment structure, the alignment feature being positioned proximate to the frangible section.

7. The wire management device of claim 3 wherein each alignment structure further includes an alignment feature extending generally perpendicular to the planar portion, the alignment features configured to engage respective edges of the mounting surface to position the wire management device on the mounting surface.

8. The wire management device of claim 1 wherein the alignment structure further includes a grip portion for being gripped to break the alignment structure from the planar portion.

9. The wire management device of claim 1 wherein the structure having a mounting surface is a mullion structure having a mounting surface and two opposing edges, the rear face of the planar portion configured for engaging the mounting surface of the mullion structure.

10. The wire management device of claim 2 further comprising a plurality of clip structures, a clip structure extending forwardly from opposing side edges the planar portion, the cover structure configured for engaging each of the clip structures to secure the cover structure with the wire management device.

11. The wire management device of claim 1 further comprising an alignment structure positioned proximate two opposing side edges of the planar portion, the alignment structures configured for engaging multiple edges of the mounting surface to align the opposing side edges of the planar portion with respect to the mounting surface edges, one of the alignment structure being breakable from the planar portion and the other of the alignment structures being rigidly coupled to the planar portion for remaining with the planar portion when the planar portion is aligned with respect to the mounting surface edge.

12. The wire management device of claim 1 further comprising a plurality of alignment structures positioned proximate to the at least one side edge of the planar portion, the plurality of alignment structures cooperating for engaging an edge of the mounting surface to align a side edge of the planar portion with respect to the mounting surface edge.

13. The wire management device of claim 3 wherein each of the alignment structures is positioned at generally an equal distance from the respective side edge of the planar portion, the alignment structures configured for engaging opposite edges of the mounting surface to generally center the planar portion with respect to the mounting surface.

14. The wire management device of claim 2 wherein the clip structure is located inwardly from the alignment structure on the planar portion.

15. The wire management device of claim 1 further comprising a plurality of wire management structures configured for capturing at least one elongated wire to secure a portion of the wire with the wire management device.

16. A method for managing wires on a structure having a mounting surface with an edge thereon, the method comprising:
positioning a planar portion having opposing side edges, a front face and a rear face to engage against a mounting surface, the planar portion including a wire management structure coupled to extend from the front face;
positioning at least one alignment structure, that is removably coupled with the planar portion, to engage an edge of the mounting surface to align a side edge of the planar portion with respect to the mounting surface edge;
securing the planar portion to the mounting surface;
breaking the at least one alignment structure away from the planar portion and separating it from the planar portion;
positioning at least one wire to be held by the wire management structure;
engaging the planar portion with a cover structure configured for coupling with the planar portion, to cover and hide the at least one wire held by the wire management structure.

17. The method of claim 16 further comprising positioning an alignment structure, that is removably coupled with the planar portion, to engage each of opposite edges of the mounting surface to generally center the planar portion with respect to the mounting surface, and breaking each of the alignment structures away from the planar portion and separating them from the planar portion after securing the planar portion to the mounting surface.

18. The method of claim 16 further comprising positioning an alignment structure to engage opposite edges of the mounting surface to generally center the planar portion with respect to the mounting surface, and breaking away at least one of the alignment structures from the planar portion and separating it from the planar portion and leaving the other of the alignment structures rigidly coupled to the planar portion for remaining with the planar.

19. The method of claim 16 wherein the planar portion includes a clip structure extending forwardly from the planar portion, the method further comprising engaging the clip structure with the cover structure to secure the cover structure with the planar portion.

20. The method of claim 19 wherein the planar portion includes a plurality of clip structures, a clip structure extending forwardly from opposing side edges the planar portion, the method further comprising engaging the clip structures with the cover structure to secure the cover structure.

* * * * *